Figure 1:

Aug. 31, 1943.     G. TÖRÖK     2,328,513
INSERTION FOR CUSHIONS OR THE LIKE
Filed Jan. 12, 1939     2 Sheets-Sheet 1

Inventor
George Torok
By Mock & Blum
Attorneys

Aug. 31, 1943.   G. TÖRÖK   2,328,513
INSERTION FOR CUSHIONS OR THE LIKE
Filed Jan. 12, 1939   2 Sheets-Sheet 2
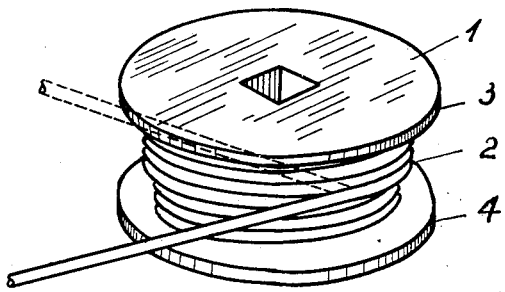
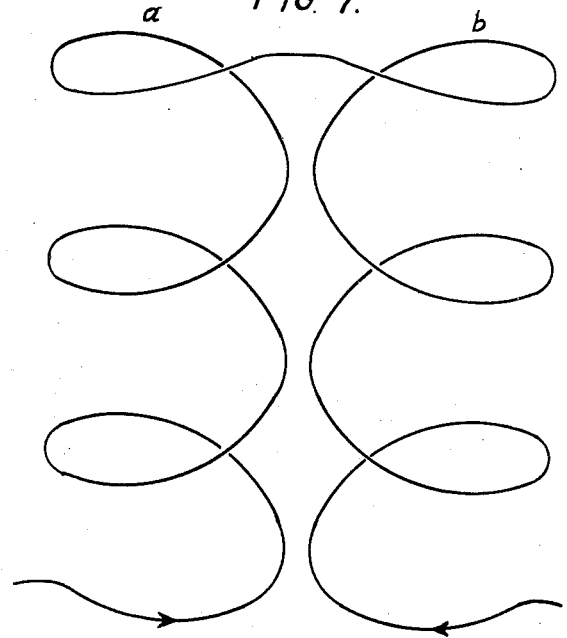
Inventor
George Torok
By Hocke Blum
Attorneys.

Patented Aug. 31, 1943

2,328,513

UNITED STATES PATENT OFFICE 2,328,513

INSERTION FOR CUSHIONS OR THE LIKE

George Török, Budapest, Hungary; vested in the Alien Property Custodian

Application January 12, 1939, Serial No. 250,505
In Hungary January 28, 1938

2 Claims. (Cl. 5—268)

This invention relates to an insertion for cushions or the like.

Spring insertions for stuffed seats, mattresses, cushions and the like are known which consist of upholstery springs generally of cylindrical or conical shape disposed side by side. In these spring insertions the individual upholstery springs are connected with one another at the upper and/or lower ends either by suitable connecting elements such as eyes, rings, or the like; or two or more upholstery springs are produced from a single wire spring in such a manner that the connection of one spring with the next following spring is formed by the wire itself from which the springs are wound, without any mechanical connection or joint. The latter method of connecting the upholstery springs could hitherto be carried out according to the known processes only in such a manner that the whole of the helical spring wire used for the manufacture of the spring insertion had at predetermined distances, that is to say after a certain number of windings, to be bent upon itself with a distortion of the wire of 180°. The helices of the spring sections obtained in this manner all run, when viewed from one side of the plane normal to the axis of the springs, clockwise or anti-clockwise.

This method of connecting the upholstery springs however has several drawbacks both with regard to the process for making the spring insertion and also with regard to the product obtained. For example, it could not be avoided that the spool holding the helical spring should be turned away at 180° in forming the individual spring sections and this accounts for the difficulties encountered in the process, leading to working troubles to a greater or less degree. This method of building up the spring sections also impairs the quality of the product obtained insofar as the distortion of the wire at 180° at the joints causes a substantial weakening of the wire at these places.

According to the invention there is provided a spring insertion for stuffed seats, mattresses, cushions or the like, comprising more than two upholstery springs arranged side by side and substantially axially parallel to one another and formed from a single continuous length of wire, the helices of said springs running alternately clockwise and anti-clockwise when viewed from one side of the plane normal to the axis of the springs.

The spring rows constituting this insertion and comprising individual spring coils connected to each other by wire portions located alternately at the upper and the lower surface of the insertion are made by a method of manufacturing spring insertions by withdrawing wire from a spool having turns of wire wound thereon, including the steps of withdrawing axially of the spool in one direction sufficient turns of wire to form a first spring, withdrawing a sufficient length of wire laterally of the spool to form a straight or curved connecting piece between said first spring and a second spring to be formed, and forming the second spring by withdrawing sufficient turns of wire axially of the spool in a direction opposite to said first-mentioned direction.

Thus the wire spring insertions may, for example, be produced by winding onto a cylindrical spool provided with two end discs a suitable metal wire of appropriate length, and then continuously withdrawing adjacent helices of the spring obtained from the spool. After the number of turns necessary for obtaining a spring section had been removed from the long wire spool, the height of the spring is definitely fixed by suitably adjusting the pitch of the windings. The wire is then conducted at the connection of the springs for a distance which is to correspond to the position of the adjacent spring along a straight or a suitable curved line, the spool holding the wire always being moved in a direction parallel to the position of the end discs of the spool. Subsequently the number of turns necessary for the adjacent spring is removed from the spool in such a way, that the spool holding the wire is moved, without turning upside down, in the opposite direction, that is to say if the first spring had been obtained by an upward movement, in the production of the second spring the spool is moved downwards. If more than two upholstery springs are to be connected by this process, the building up of the row of springs is continued in a similar way until the desired number of springs is obtained. The end springs of the spring insertion may in known manner be tied to one or more holding frames.

It will be understood that whilst the upholstery springs have been described as being arranged side by side, they may, if desired, be intertwined in known manner with one another, in which case each of the helices is intertwined during its production with the corresponding turn of the adjacent spring. The term "intertwined" means that the wire of one coil first passes under the wire of the other coil and then repasses over the other wire. Intertwining spring coils which are wound differently, that is to say, clockwise and anti-clockwise respectively, have an effect very different from and much superior to such ordinary intertwining where the coils of the spring row run in the same direction. According to my invention, each two adjacent spring coils are wound in opposite directions and, therefore, have adjacent coil portions ascending in the same direction. This structure provides a close contact between the intertwined wire portions at at least two points and a considerable mutual support.

The invention is a substantial simplification insofar as it enables spring sections to be made without turning upside down the spools or other similar means from which the helices of the wire spring are removed. In this manner the excessive distortion of the wire spring can be avoided at the joints so that these connecting places of the springs are not weakened.

Figure 2:
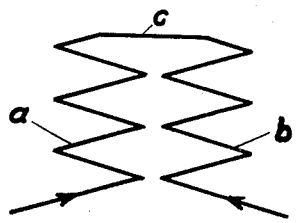
Figure 3:
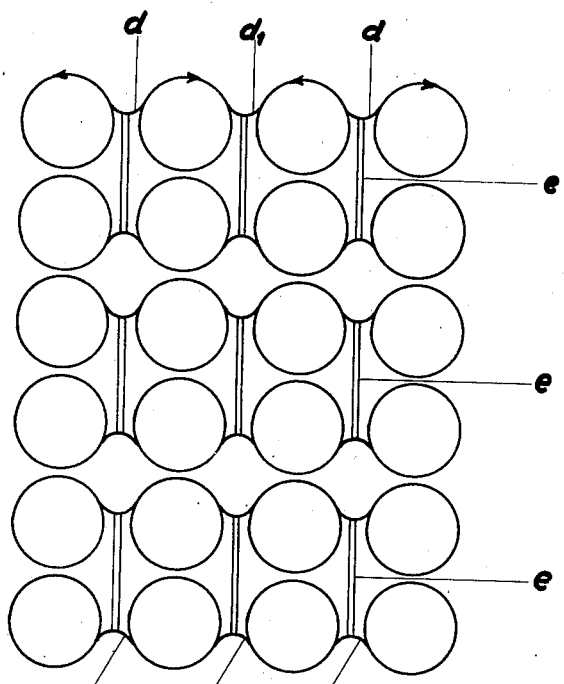
Figure 5:
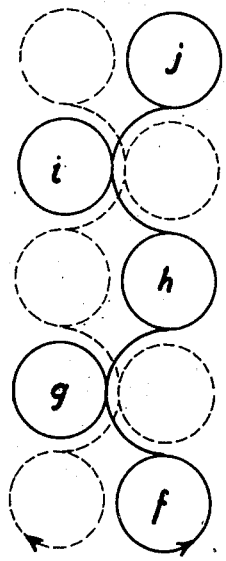
Figure 4:
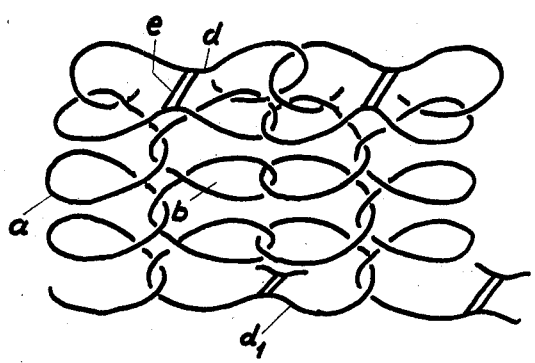

The invention will now be described by way of example with reference to the accompanying drawings in which:

Figs. 1 and 2 show respectively a top plan view and a side elevation of one embodiment of the invention, Fig. 3 shows on a larger scale a top plan view of a part of another embodiment of the invention, Fig. 4 is a perspective side elevation of an insertion, Fig. 5 shows another method of carrying out the invention, Fig. 6 is a perspective side elevation of a device for manufacturing spring insertions according to the invention, and Fig. 7 is a perspective side elevation of a spring insertion produced with the aid of the device illustrated in Fig. 6.

Referring to Figs. 1 and 2 of the drawings the springs $a$ and $b$ are connected by the straight wire piece $c$. The turns of the spring $a$ run counter-clockwise while the turns of the spring $b$ are run in the opposite direction.

Figs. 3 and 4 show methods of connecting the springs in which the connecting pieces of the wire spring are not led along a straight line, but have at the upper end of the springs the recesses $d$ and at the lower side the recesses $d_1$. The recesses $d$ and $d_1$ have the advantage that thereby it is possible to bridge over those spaces at the upper surface of the spring insertion, which are formed between the individual upholstery springs and which might cause discontinuities in the surface, by connecting members $e$ such as metal bands, wires and strips.

The connecting members $e$ ensure the further advantage that in loading the spring insertion, the distribution of the tension throughout the whole of the upholstery becomes substantially more uniform in that the connected springs support each other more effectively in balancing out the load. In this manner it is possible to use finer wire for balancing out one and the same load than if no connecting members had been used.

According to the invention the adjacent springs in a spring row are not necessarily connected in the way described above, but the springs of adjacent rows might also be connected in zig-zag fashion for example in Fig. 5 the spring $f$ is connected at the upper surface of the spring insertion with the spring $g$ of the preceding spring row. In this manner one may proceed through springs $h$, $i$ and $j$ up to the end of the spring rows. In the same manner the empty places formed during the production of the springs $f$ to $j$ are filled out by other springs. The spring insertion obtained according to this method shows besides the different direction of the connecting wires of the joints the same construction obtained with springs, the connection of which is effected in one and the same spring row.

Referring now to Figs. 6 and 7, a spool 1, having at its upper and lower ends flanges or discs 3 and 4 respectively, carries a winding of wire 2 between these flanges or discs. For the formation of a spring insertion such as that illustrated in Fig. 7, the spool 1 is moved upwards until sufficient turns of wire have been withdrawn over the lower flange 4 to form the first spring $a$ (Fig. 7). During this operation the spool 1 is practically co-axial with the spring $a$. The spool is then moved laterally and horizontally, its axes being maintained parallel to the axis of the spring $a$, until it reaches a position co-axial to the spring $b$ which is now to be formed. The spool is then moved vertically downwards until sufficient turns of wire have been withdrawn over the upper flange 3 to form the second spring $b$. In this way the spool is moved alternately up and down, with intermediate lateral movement, the axis of the spool always remaining parallel to the axis of the springs, so that the wire never becomes distorted.

Having now particularly described and ascertained the nature of my said invention and in what manner the same is to be performed, I declare that what I claim is:

1. A spring insertion for stuffed seats, mattresses, cushions or like supports for human bodies, comprising more than two upholstery springs arranged side by side, substantially axially parallel to each other and formed from a single continuous length of wire, the helices of said springs running alternately clockwise and anti-clockwise when viewed from one side of the plane normal to the axes of the springs, adjacent springs touching each other at adjacent coil portions ascending in the same direction, each pair of said touching coil portions being so positioned that the wire of one coil first passes under the wire of the other coil, then ascends substantially in the same plane with the other touching coil portion, and finally repasses over the other wire, whereby said two coils are intertwined.

2. A spring insertion for stuffed seats, mattresses, cushions and like supports for human bodies, comprising more than one row of more than two upholstery springs arranged side by side and substantially parallel to each other, the springs of each row being formed from a single continuous length of wire, the helices of said springs running alternately clockwise and anti-clockwise when viewed from one side of the plane normal to the axes of the springs, adjacent springs touching each other at adjacent coil portions ascending in the same direction, each pair of said touching coil portions being so positioned that the wire of one coil first passes under the wire of the other coil, then ascends substantially in the same plane with the other touching coil portion, and finally repasses over the other wire, whereby the said two coils are intertwined, portions of said wire connecting subsequent springs of the same row and situated at opposite sides of two adjacent rows, and connecting elements longer than the distance between the axes of the springs of said adjacent rows, each of said elements being secured to two opposite connecting wire portions of said two rows, whereby the spaces formed on the surface of the insertion between the springs are bridged over.

GEORGE TÖRÖK.